(12) United States Patent
Schumacher

(10) Patent No.: US 11,828,251 B2
(45) Date of Patent: Nov. 28, 2023

(54) INJECTOR FOR A COMBUSTION ENGINE, IN PARTICULAR OF A MOTOR VEHICLE, AND COMBUSTION ENGINE FOR A MOTOR VEHICLE

(71) Applicant: Daimler Truck AG, Leinfelden-Echterdingen (DE)

(72) Inventor: Moritz Schumacher, Schorndorf (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 0 days.

(21) Appl. No.: 17/927,552

(22) PCT Filed: May 19, 2021

(86) PCT No.: PCT/EP2021/063240
§ 371 (c)(1),
(2) Date: Nov. 23, 2022

(87) PCT Pub. No.: WO2021/239530
PCT Pub. Date: Dec. 2, 2021

(65) Prior Publication Data
US 2023/0304458 A1 Sep. 28, 2023

(30) Foreign Application Priority Data
May 25, 2020 (DE) .................... 10 2020 003 127.7

(51) Int. Cl.
*F02M 21/02* (2006.01)
*F02M 51/06* (2006.01)
*F02M 61/08* (2006.01)

(52) U.S. Cl.
CPC .... *F02M 21/0254* (2013.01); *F02M 21/0257* (2013.01); *F02M 21/0275* (2013.01); *F02M 51/0689* (2013.01); *F02M 61/08* (2013.01)

(58) Field of Classification Search
CPC ........... F02M 63/0077; F02M 51/0614; F02M 51/0685; F02M 61/166; F02M 63/0019; F02M 63/0022; F02M 63/0075
See application file for complete search history.

(56) References Cited

U.S. PATENT DOCUMENTS 4,976,244 A * 12/1990 Eckert .................... F02M 59/30
239/95
5,235,954 A * 8/1993 Sverdlin ............... F02D 41/266
251/129.09

(Continued)

FOREIGN PATENT DOCUMENTS

DE         102 61 610 A1    7/2004
DE   10 2005 038 891 A1    2/2007

(Continued)

OTHER PUBLICATIONS

PCT/EP2021/063240, International Search Report dated Sep. 21, 2021 (Two (2) pages).

*Primary Examiner* — John Kwon
(74) *Attorney, Agent, or Firm* — Crowell & Moring LLP

(57) ABSTRACT

A fuel injector for a combustion engine. The fuel injector includes a check valve with a return element that is a magnet, by means of which a magnetic field can be provided or is provided, such that, as a result of the decrease in pressure, a second valve element of the check valve can be moved from an open position back into a closed position and held in the closed position.

10 Claims, 2 Drawing Sheets

(56) References Cited

U.S. PATENT DOCUMENTS

| | | | | |
|---|---|---|---|---|
| 5,407,131 | A * | 4/1995 | Maley | F02M 59/466 |
| | | | | 239/90 |
| 7,191,744 | B2 * | 3/2007 | Minato | F01L 9/10 |
| | | | | 123/90.15 |
| 9,453,486 | B1 | 9/2016 | Hornby et al. | |
| 2004/0020467 | A1 * | 2/2004 | Leman | F02M 47/043 |
| | | | | 123/446 |
| 2006/0231785 | A1 | 10/2006 | Hans et al. | |
| 2008/0095647 | A1 * | 4/2008 | Grundl | F04B 17/042 |
| | | | | 417/417 |
| 2009/0326788 | A1 * | 12/2009 | Yuasa | F02M 63/0225 |
| | | | | 701/104 |
| 2023/0160330 | A1 * | 5/2023 | Fan | F02M 43/00 |
| | | | | 123/41.21 |

FOREIGN PATENT DOCUMENTS

| | | |
|---|---|---|
| DE | 10 2016 204 569 A1 | 9/2016 |
| EP | 3 361 085 A1 | 8/2018 |

* cited by examiner

INJECTOR FOR A COMBUSTION ENGINE, IN PARTICULAR OF A MOTOR VEHICLE, AND COMBUSTION ENGINE FOR A MOTOR VEHICLE

BACKGROUND AND SUMMARY OF THE INVENTION

The invention relates to an injector for a combustion engine, in particular of a motor vehicle. Furthermore, the invention relates to a combustion engine for a motor vehicle.

DE 10 2016 204 569 B4 discloses an injection nozzle with an inlet and an outlet for injecting gaseous fuels into an internal combustion engine. Furthermore, DE 10 2005 038 891 A1 discloses an actuator device, with a housing extending in the axial direction and an actuator element positioned therein and fixed axially at one end, the axial length of which is variable. Furthermore, an electromagnetic switching valve for a fuel injection system is known from EP 3 361 085 A1.

The object of the present invention is to provide an injector for a combustion engine, in particular of a motor vehicle, and a combustion engine for a motor vehicle, so that excessive pressure losses can be avoided.

This object is achieved by an injector having the features disclosed herein.

A first aspect of the invention relates to an injector for introducing fuel, in particular gaseous fuel, into at least one combustion chamber of a combustion engine, for example in the form of a reciprocating piston engine, in particular of a motor vehicle. This means that the motor vehicle, which is preferably formed as a motor vehicle, in particular as a commercial vehicle, has in its completely manufactured state the combustion engine, which is also referred to as an engine or internal combustion engine and is formed, for example, as a reciprocating engine, and can be driven by means of the combustion engine, in particular as an internal combustion engine. The combustion engine has the aforementioned combustion chamber into which the fuel can be introduced by means of the injector. In particular, provision can be made for the fuel to be introduced directly into the combustion chamber by means of the injector, in particular to be shot in or injected in, so that, for example, in the completely manufactured state of the combustion engine, the injector opens, in particular directly, into the combustion chamber, in particular via its outlet opening, which is also referred to as the outlet.

The fuel can be a liquid fuel such as gasoline or petrol or a diesel fuel. Preferably, the injector is also designed to introduce a gaseous fuel into the combustion chamber. The introduction, in particular the direct introduction, of the gaseous fuel into the combustion chamber is also referred to as injection, so that it is preferably provided that the gaseous fuel can be injected directly into the combustion chamber by means of the injector. This means in particular that the fuel flows through the injector in a gaseous state and flows out of the injector, in particular from the outlet, in a gaseous state and thereby flows, in particular directly, into the combustion chamber.

For this purpose, the injector has an injector housing through which the fuel can flow, which is also referred to simply as the housing. The injector housing has at least or exactly one inlet opening, also referred to as an inlet, through which the fuel can be introduced, in particular from outside the injector housing and in particular outside the injector as a whole, into the injector housing and thus into the injector. In addition, the injector housing has at least or precisely one outlet opening, also referred to as an outlet, which may be the aforementioned outlet opening or the aforementioned outlet. For the introduction, in particular direct introduction, of the fuel into the combustion chamber, the fuel can be discharged from the injector housing (housing) via the outlet opening, and preferably from the injector as a whole. In other words, when the outlet opening is released, the fuel flowing through the housing can flow through the outlet opening and thus can flow out of the housing and in particular out of the injector as a whole via the outlet opening, and subsequently can flow into the combustion chamber, in particular directly. As a result, the fuel can be or is introduced, in particular directly, into the combustion chamber.

The injector additionally has at least one flow opening arranged inside the injector housing downstream of the inlet opening and upstream of the outlet opening. This means that in the direction of flow of the fuel flowing from the inlet to the outlet and thus flowing through the injector housing, the flow opening is arranged upstream of the outlet opening and downstream of the inlet opening, i.e. between the inlet opening and the outlet opening. Through this, the outlet opening can be supplied via the flow opening with the fuel flowing through the inlet opening, i.e. with the fuel flowing through the inlet opening and thus flowing into the injector housing via the inlet opening. In other words, when the flow opening is released, the fuel can flow through the flow opening and can thus flow from the inlet via the flow opening to the outlet.

The injector has an electrically actuatable first valve, which has a first valve element arranged in the injector housing. The first valve element can be moved relative to the injector housing, in particular translationally, by electrically actuating the first valve between a first closed position fluidically blocking the flow opening and at least one first open position releasing the flow opening. This means in particular that the first valve element fluidically blocks the flow opening in the first closed position, so that the fuel cannot flow through the flow opening and thus cannot flow from the inlet via the flow opening to the outlet. In the first open position, however, the first valve element releases the flow opening so that the fuel can flow through the flow opening and can thus flow from the inlet to the outlet via the flow opening. The feature that the first valve is electrically actuatable shall be understood to mean in particular that the first valve is actuatable using electrical energy or electrical current in order to thereby move the first valve element between the first open position and the second open position, i.e. in order to thereby effect a movement of the first valve element between the first open position and the first closed position. The first open position is also referred to as the first position, and the first closed position is also referred to as the second position. The feature that the first valve is electrically actuatable can be understood in particular to mean that by supplying the first valve with electrical energy, in particular with electrical current, the first valve element can be moved from one of the positions into the other position, in particular translationally. In other words, by supplying the first valve with electrical energy, in particular with electrical current, a movement of the first valve element from one position to the other position can be effected. By terminating or cancelling the supply of electrical energy to the first valve, the valve element can be moved, for example, from the other position to the one position. In other words, by stopping or cancelling the supply of electrical energy to the first valve, a movement of the first valve element from the other position to the one position can be effected. The one position is, for example, the first closed position, the other position being, for example, the first open position. Thus, it is conceivable that supplying the first valve with electrical energy causes a movement of the first valve element from the first closed position to the first open position. If the supply of electrical energy to the first valve is cancelled or terminated, a movement of the first valve element from the first open position to the first closed position can be effected or permitted. This allows the first valve to be actuated, i.e. opened or closed, in a particularly demand-oriented manner. In other words, the first valve element can be moved between the open position and the closed position as required. Since the flow opening can be opened or closed by means of the first valve element as required, the first valve and thus the first valve element are associated with the flow opening. For example, the first valve is formed as a solenoid valve.

The injector additionally comprises a check valve associated with the outlet opening, the check valve being a second valve of the injector or also referred to as a second valve. The second valve (check valve) has a return element and a second valve element associated with the outlet opening. The second valve element is arranged in the injector housing and is movable relative to the injector housing, in particular translationally, between a second closed position fluidically blocking the outlet opening and at least one second open position releasing the outlet opening. This means that, in the second closed position, the second valve element fluidically blocks the outlet opening, so that the fuel cannot flow through the outlet opening and thus cannot flow out of the injector housing or out of the injector as a whole. In the second open position, however, the second valve element releases the outlet opening so that the fuel can then flow through the outlet opening and can thus flow out of the injector housing via the outlet opening and thus out of the injector as a whole.

The second valve element is movable from the second closed position to the second open position, in particular solely, by means of a pressure caused by the fuel flowing from the flow opening to the second valve element and acting, in particular directly, on the second valve element. In other words, the fuel flowing from the flow opening to the second valve element can, for example, directly contact at least a partial region of the second valve element and thus directly act thereon. In this case, the fuel has a pressure which can thus act, in particular directly, on the partial region or on the second valve element. The pressure of the fuel, which in particular acts directly on the second valve element, results in an opening force, which in particular acts directly on the valve element. By means of the opening force, the valve element can be moved from the second closed position into the second open position relative to the injector housing. Preferably, the injector is formed such that the second valve element can be moved from the second closed position into the second open position exclusively by the opening force or exclusively by the pressure of the fuel. Thus, for example, the second valve element can be moved, in particular exclusively, hydraulically or pneumatically from the second closed position into the second open position.

After a movement of the second valve element from the second closed position into the second open position caused by the fuel or by the pressure of the fuel, the second valve element can be moved from the second open position back into the second closed position as a result of a decrease or a cancellation of the pressure of the fuel by means of the return element, in particular solely and exclusively by means of the return element. The decrease in pressure is to be understood in particular as follows: At least in the second open position, the return element provides a return force acting at least indirectly, in particular directly, on the valve element, which for example counteracts or opposes the opening force. If the pressure exceeds an in particular predefinable or predefined threshold value, for example in such a way that the opening force becomes greater than the return force, the second valve element is moved by means of the opening force against the return force from the second closed position into the second open position relative to the injector housing, in particular translationally. If the pressure and thus the opening force then decrease, for example, in such a way that the opening force becomes smaller than the return force, the pressure and thus the opening force decreasing, for example, to zero or decreasing to a value greater than zero, the second valve element is then moved again from the second open position into the second closed position, in particular exclusively or solely, by the return force. In addition, the second valve element is to be held in the second closed position, in particular after its movement from the second open position back into the second closed position, by means of the return element or by means of the return force, so that when the opening force is less than the return force and/or when the flow opening is closed, i.e. fluidically blocked by means of the first valve element, the second valve element remains securely in the second closed position.

In order to be able to avoid excessive pressure losses caused by the injector, in particular of the fuel, it is provided in accordance with the invention that the return element of the second valve is a magnet by means of which a magnetic field can be provided or is provided. By means of the magnetic field, as a result of the decrease in pressure, the second valve element can be moved from the second open position back into the second closed position and then held in the second closed position. This means that the previously described return force results from the magnetic field or is caused by the magnetic field, in particular as a result of an interaction or an interdependence of the magnetic field with a material which is, for example, a magnetised or magnetisable material, such as a ferromagnetic material. In the injector according to the invention, the aforementioned return force is thus a magnetic force resulting or arising from the magnetic field or from the interaction between the magnetic field and the material, by means of which magnetic force, for example, the second valve element is moved back into the second closed position after it has been moved from the second closed position into the second open position as a result of the described decrease in pressure from the second open position. Again, in other words, if, for example, the pressure and thus the opening force decrease in such a way that the opening force is lower than the return force formed as a magnetic force, the second valve element will be or is thus moved by means of the magnetic force (return force) and thus magnetically from the second open position back into the second closed position and is then held in the second closed position.

The invention is based in particular on the following findings: In particular, if the injector is configured to introduce the fuel directly into the combustion chamber, in particular to shoot it in or inject it in, the injector is also referred to as a direct injector. The combustion engine can be operated by means of the fuel in a fired mode in which combustion processes take place in the combustion chamber. If the fuel is a gaseous fuel, the combustion engine, also referred to as an engine or internal combustion engine, is also referred to as a gas engine. In the context of the present disclosure, a or the gaseous fuel is understood to mean, for example, natural gas (CNG, LNG), LPG, hydrogen and any other gaseous fuel. Injectors and in particular direct injectors for internal combustion engines, in particular for gas engines, generally exhibit a certain amount of leakage in their closed state, that is to say in particular when the valve elements are in their closed positions. In the second closed position, for example, the second valve element is seated against a corresponding sealing seat, thereby fluidically blocking the outlet opening. In particular, if the injector is formed as a direct injector, the sealing seat is exposed to high pressures and high temperatures from the combustion chamber, or the sealing seat must withstand such high pressures and high temperatures over a sufficiently long period of time at least substantially without damage. Thus, for example, the sealing seat is metal, i.e. made of a metal material. In particular, the sealing seat may be arranged in the combustion chamber in a completely manufactured state. Furthermore, the sealing seat and thus the second valve element may be arranged substantially closer to the combustion chamber than the first valve element. In particular, it is conceivable that the sealing seat and the second valve element are arranged in the combustion chamber, while the first valve element and its further sealing seat are arranged outside the combustion chamber.

Furthermore, the fuel has a low viscosity, especially if it is a gaseous fuel. This low viscosity of the fuel, together with unavoidable surface roughness of the, for example, metal sealing seat, leads to leaks in the closed state, i.e. when the second valve element is in its second closed position, so that—although the second valve element is in its second closed position—fuel can flow through between the second valve element and the sealing seat and can thus flow through the outlet opening and consequently can flow out of the injector housing or out of the injector as a whole. This can lead to unwanted effects such as deflagration and damage to engine and peripheral components.

One way to avoid excessive leakage in such injectors, especially direct injectors, is to serially couple or interconnect the valves and thus the valve elements. In other words, in the injector according to the invention, the valve elements and thus the valves are arranged or connected serially to one another, in particular in the direction of flow of the fuel flowing from the inlet opening via the flow opening to the outlet opening. In this case, the first valve can have a first sealing seat for the first valve element, the first valve element being seated in its first closed position, in particular directly, on the first valve seat. The second valve has a second sealing seat for the second valve element, which is seated in its second closed position, in particular directly, on the second valve seat. In order to realise a particularly high robustness of the second valve seat, the second valve seat is preferably embodied as a metal valve seat, i.e. formed from a metal material such as a steel. The valve seat in question is also referred to as a sealing seat, since the valve seat in question and the corresponding, associated valve element are used to fluidically block the flow opening or the outlet opening in the particular closed position. In order to avoid excessive leakage, the first valve seat or sealing seat is formed, for example, as an elastomeric sealing seat, i.e. is formed from an elastically deformable material or from a rubber or from an elastomer. In this way, the first valve seat or the first valve can be designed to be at least virtually leak-free, so that excessive leaks, through which fuel can flow out of the injector undesirably, can be avoided. By means of the second valve seat and by means of the second valve element, a sufficient seal can be realised with respect to the combustion chamber and in particular with respect to a combustion chamber pressure prevailing in the combustion chamber.

Since the first valve and the first valve element are arranged upstream of the second valve and the second valve element and are further away from the combustion chamber than the second valve and the second valve element, the second valve element is also referred to as a fuel-side valve element, which is arranged on a so-called fuel side of the injector. The second valve element is a combustion-chamber-side valve element, which is arranged on a combustion chamber side of the injector. The first valve and thus the first valve element on the fuel side are actively actuated or can be actively actuated, since the first valve element can be moved between the first closed position and the first open position by electrically actuating the first valve and thus using electrical energy. The second valve on the combustion chamber side is, for example, a passive check valve in which the second valve element can be moved between the second closed position and the second open position, i.e. from the second closed position into the second open position and from the second open position into the second closed position, preferably without external actuation or control, i.e. in particular without supplying the second valve with electrical energy. The movement of the second valve element from the second closed position into the second open position is effected, in particular solely, by the pressure of the fuel, also referred to as fuel pressure, and the movement of the second valve element from the second open position into the second closed position is preferably effected solely by the return force and thus by means of the return element.

In conventional injectors, in particular direct injectors, the return element is a spring, preferably a mechanical spring and thus preferably in the form of a solid body, which is configured or functions, for example, as a tension or compression spring. Thus, in conventional injectors, the return force is a spring force provided by the spring. If, in conventional injectors, the second valve element is moved from the second closed position into the second open position, this causes the spring to be tensioned so that, at least in the second open position, the spring provides the aforementioned spring force, which acts at least indirectly, in particular directly, on the second valve element. By means of the spring force, which acts as the return force, the second valve element is then moved back from the second open position into the second closed position and, in particular, held in the second closed position. Therefore, the spring is also referred to as the closing spring. Since the second valve element must be opened against the closing spring or against the spring force, in particular by the fuel or by the pressure of the fuel, i.e. moved from the second open position into the second closed position and held open, i.e. held in the second open position, there is necessarily a pressure loss of the fuel.

Due to the fact that the injector comprises the first valve and the second valve as well as the flow opening and the downstream outlet opening, the injector is formed as a two-stage injector, in particular as a two-stage direct injector and very particularly as a two-stage gas direct injector. The spring force that has to be overcome to open the second valve element and to keep the second valve element open is very high, so that in conventional injectors there is an excessive pressure loss of the fuel.

Such an excessive pressure loss of the fuel can now be avoided by the invention, since the return element is not formed as a spring, but as a or the magnet described above. Thus, the return force is not a spring force, but the magnetic force described before, whereby excessive pressure losses can be avoided. Due to the magnet and the magnetic force resulting from the magnetic field, a magnetic and preferably passive drive for the second valve element can be realised or is realised, and therefore an excessive pressure loss can be avoided.

In order to be able to realise a particularly efficient operation of the injector and thus of the combustion engine and of the motor vehicle as a whole, it is provided in one embodiment of the invention that the magnet is a permanent magnet by means of which the magnetic field is provided. In this way, the magnetic drive can be formed as a passive drive, so that the second valve can function like a conventional check valve having a return spring, but with the difference that the return element is not formed as a spring or as a return spring, but as a permanent magnet. In this way, excessive pressure loss can be avoided particularly well. The second valve element can preferably be opened here exclusively by the pressure of the fuel and without the second valve being supplied with electrical energy, and the second valve element can preferably be closed exclusively by the magnetic force and without the second valve being supplied with electrical energy.

A further embodiment is distinguished in that the injector comprises a or the aforementioned material which is configured to interact with the magnetic field in such a way that a force acting on the second valve element results from the magnetic field. This force is the aforementioned return or magnetic force by means of which, as a result of the decrease in pressure, the second valve element can be moved from the second open position back into the second closed position and can then be held in the second closed position. This allows the second valve to function particularly advantageously like a conventional, passive check valve, although excessive pressure losses can be avoided.

Preferably, the material is provided on the second valve element and is thus movable with the second valve element between the second open position and the second closed position relative to the injector housing, in particular translationally. In other words, the second valve element may comprise the material. Then, for example, the magnet is held, in particular fixed, on the injector housing, so that, for example, the second valve element and with it the material are movable relative to the injector housing and relative to the magnet between the second open position and the second closed position. Furthermore, it is conceivable that the material is provided, in particular fixed, on the housing, so that, for example, the housing comprises the material. Then it is preferably provided that the magnet is provided or held on the second valve element, so that for example the second valve element comprises the magnet. It is thus conceivable, for example, that the magnet can be moved with the second valve element relative to the injector housing between the second open position and the second closed position, in particular translationally.

A further embodiment provides that moving the second valve element from the closed position to the open position increases a distance between the magnet and the material, in particular successively, as a result of which the force (return or magnetic force) decreases non-linearly, in particular disproportionately and very particularly quadratically, relative to the distance. The quadratic decrease means in particular that when the distance is doubled, in particular starting from an initial value of the distance, the force, in particular starting from an initial force, is quartered, i.e. is only a quarter as great as when the distance has the initial value. The magnetic force thus exhibits a non-linear behaviour, so that a hysteresis or hysteresis effect is created, in particular to the effect that—when the second valve element is initially in the second closed position—a high opening force must initially act or be exerted on the second valve element in order to initially move the second valve element a short distance out of the second closed position and thus to move the short distance out of the second closed position in the direction of the second open position. After this initial movement of the second valve element out of the second closed position in the direction of the second open position, which is caused by the high opening force, an opening or holding force that is considerably lower than the high opening force is sufficient to move the second valve element further in the direction of the second open position, and in particular in the second open position, or to hold it in the second open position. Since the high opening force occurs only initially and thus for a very limited period of time, and then only the lower holding force has to be applied in order to hold the second valve element in the second open position, the pressure loss of the fuel can be kept particularly low overall, i.e. over a period of time during which the second valve element is moved from the second closed position into the second open position and then during which the second valve element is moved from the second closed position into the second open position and then held in the second open position, in particular without interruption. In other words, the aforementioned hysteresis effect is distinguished in particular by a high closing force when the second valve element is closed, but by only a low closing force when the second valve element is open. In other words, the return force (magnetic force), also referred to as closing force and acting on the second valve element, is high when the second valve element is in the second closed position and thus the distance is small or even eliminated, and thus has a first value. However, if the second valve element is in the second open position, so that the distance has a second value that is greater than the first value, the closing force (return or magnetic force) acting on the second valve element is less than in the second closed position. Thus, a high pressure loss occurs for a very short time when the second valve element is opened. However, when the second valve element is open, so that the second valve element is in its second open position, there is only a very small pressure loss via the check valve. Nevertheless, the check valve or the second valve element closes automatically when no more fuel flows from the flow opening to the second valve element and passes through the check valve. A low pressure loss caused by the check valve and thus, for example, the high pressure loss via the combustion-chamber-side check valve that occurs briefly during opening may even be desirable in order to keep as low as possible the pressure of the fuel, also referred to as fuel pressure, which can flow through the outlet opening with the fuel pressure and can thus flow out of the injector and into the combustion chamber. This may be particularly desirable in the case of fuels stored in gaseous form, in order, for example, to be able to empty a pressure tank, in which the fuel is stored in gaseous form, as far or as strongly as possible. Furthermore, the check valve of the injector according to the invention allows the realisation of clearly defined states of the check valve, in particular instead of a proportional characteristic curve as is the case with conventional check valves, for example.

In a particularly advantageous embodiment of the invention, the second valve element is translationally movable along a direction of movement relative to the injector housing between the second open position and the second closed position. In this way, excessive pressure losses can be avoided particularly well.

In this context, it has been shown to be particularly advantageous if the material, at least in the second open position, in particular also in the second closed position, is arranged along a direction running perpendicular to the direction of movement and in particular pointing outwards or inwards without overlap with the magnet, i.e. is not overlapped by the magnet. The said direction running perpendicular to the direction of movement coincides, for example, with the radial direction of the second valve, in particular of the second valve element, in particular, for example, if the second valve and/or the second valve element is cylindrical, that is, has the shape of a straight circular cylinder, or is spherical, at least in a longitudinal region. With this embodiment, the effect described above, according to which the magnetic or return force acting at least indirectly, in particular directly, on the second valve element decreases non-linearly and preferably disproportionately or quadratically with increasing distance, can be realised particularly well. This means that the hysteresis effect described above can be presented particularly well.

In order to be able to present the hysteresis effect particularly well, so that initially a high opening force is required to open the second valve element and then only a lower opening force is required to keep the second valve element open, it is provided in a further embodiment of the invention, that the material is at least partially overlapped by the magnet both in the second open position and in the second closed position in a direction running parallel to the direction of movement and pointing towards or away from the first valve, which direction, for example, runs parallel to the axial direction of the second valve or of the second valve element. As a result, the distance between the material and the magnet, which runs in particular along the direction of movement, increases when the second valve element is moved from the second closed position into the second open position, and the distance decreases, in particular linearly, when the second valve element is moved from the second open position into the second closed position.

A further embodiment is distinguished in that said distance runs along the direction of movement or parallel to the direction of movement.

Lastly, it has been shown to be particularly advantageous if the first valve element can be moved in a first opening direction from the first closed position into the first open position relative to the injector housing, in particular translationally. The second valve element can be moved in a second opening direction running opposite the first opening direction and, for example, parallel to the direction of movement, from the second closed position into the second open position relative to the injector housing, in particular translationally. This makes it particularly easy to avoid excessive pressure losses.

A second aspect of the invention relates to a combustion engine, preferably in the form of a reciprocating piston engine, for a motor vehicle. The combustion engine comprises at least one injector according to the first aspect of the invention.

Advantages and advantageous embodiments of the first aspect of the invention are to be regarded as advantages and advantageous embodiments of the second aspect of the invention, and vice versa.

Further advantages, features and details of the invention will become apparent from the following description of a preferred exemplary embodiment and from the drawing. The features and combinations of features mentioned above in the description, as well as the features and combinations of features mentioned below in the description of the figures and/or shown alone in the figures can be used not only in the combination indicated in each case, but also in other combinations or on their own, without departing from the scope of the invention.

DETAILED DESCRIPTION OF THE DRAWINGS

In the figures the same or functionally like elements are provided with the same reference signs.

Figure 1:
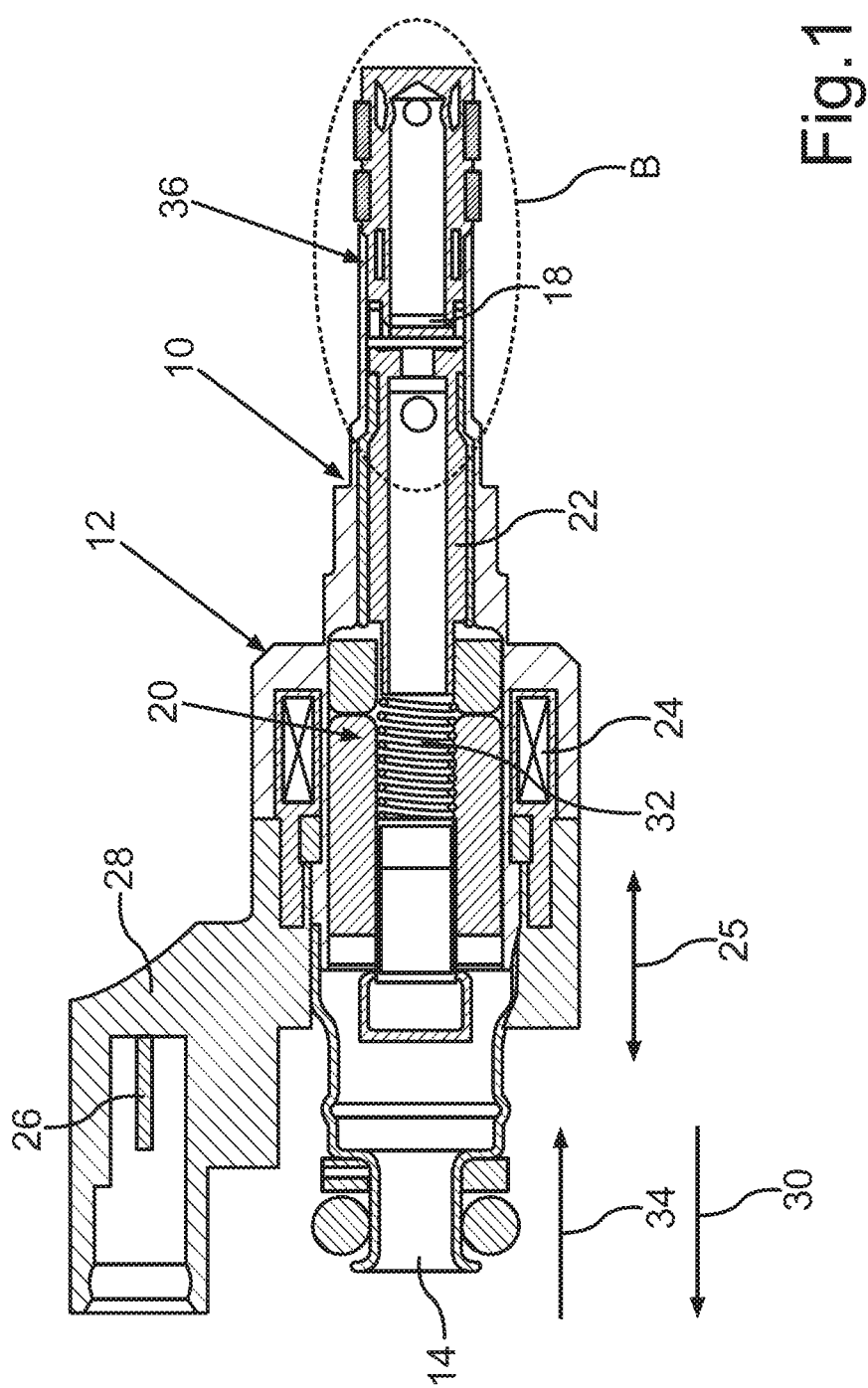
FIG. 1 shows a schematic longitudinal sectional view of an injector according to the invention for introducing fuel into at least one combustion chamber of a combustion engine, in particular of a motor vehicle.

FIG. 1 shows a schematic longitudinal sectional view of an injector 10 for introducing fuel, in particular gaseous fuel, into at least one combustion chamber of a combustion engine of a motor vehicle, which is preferably formed as a reciprocating piston engine. This means that the motor vehicle in its completely manufactured state comprises the combustion engine and can be driven by means of the combustion engine, in particular as a combustion engine. The combustion engine, also referred to as the engine or internal combustion engine, comprises said combustion chamber into which the fuel can be introduced, in particular directly, by means of the injector 10. Preferably, the fuel is a gaseous fuel such as hydrogen, for example, which is introduced, in particular injected, directly into the combustion chamber in a gaseous state by means of the injector 10. This means in particular that the fuel flows out of the injector 10 in a gaseous state and thereby flows, in particular directly, into the combustion chamber. Thus, the injector 10 is also referred to as a gas injector, direct injector or gas direct injector.

The injector 10 has an injector housing 12 through which the fuel can flow and which is also referred to simply as the housing. The injector housing 12 has at least or precisely one inlet opening 14, also referred to as an inlet, through which the fuel can be introduced or can be fed into the injector housing 12, in particular from a surrounding area of the injector housing 12 and in particular of the injector 10 as a whole. Furthermore—as can be seen particularly well in conjunction with FIG. 2—the injector housing 12 and thus the injector 10 have an outlet opening 16, also referred to as an outlet, via which the fuel flowing into the injector housing 12 via the inlet and flowing from the inlet to the outlet can be discharged from the injector housing 12 and thus from the injector 10 as a whole for the purpose of introducing, in particular directly injecting, the fuel into the combustion chamber. In the direction of flow of the fuel flowing from the inlet to the outlet, the outlet is thus arranged downstream of the inlet.

The injector 10 additionally comprises at least one flow opening 18 disposed within the injector housing 12, the flow opening 18 being disposed upstream of the outlet and downstream of the inlet in the direction of flow of fuel flowing from the inlet to the outlet. On its way from the inlet to the outlet, the fuel flows through the flow opening 18, whereby the outlet opening 16 can be supplied via the flow opening 18 with the fuel which flows through the inlet and thus enters the injector housing 12 via the inlet.

The injector 10 additionally comprises a first valve 20 which can be actuated electrically, in particular electromagnetically, and which is formed, for example, as a solenoid valve in the present case. The valve 20 has a first valve element 22 which is arranged in the injector housing 12 and which, by electrical actuation of the first valve 20 and, in this case, electromagnetically, can be moved in translation relative to the injector housing 12 between a first closed position fluidically blocking the flow opening 18 and shown in FIGS. 1 and 2 and at least a first open position releasing the flow opening 18 along a direction of movement illustrated in FIG. 2 by a double arrow 25. For this purpose, the valve 20, which is in the form of a solenoid valve, has a coil 24, also referred to as a solenoid coil, which can be supplied with electrical energy, in particular electrical current, in such a way that, by supplying the coil 24 with electrical energy or electrical current, the electrical current can flow through the coil 24. For example, the coil 24 is fixed to the injector housing 12, in particular via a stator of the valve 20. In this case, for example, the coil 24 is held on the stator and is thus fixed. In particular, the coil can be supplied with the electrical energy via at least one electrical contact element 26, also referred to as a terminal, which is provided, for example, from an energy source not shown in the figures. The contact element 26 is arranged in a housing 28, which is formed from a plastic, for example. Alternatively or additionally, the housing 28 is formed separately from the injector housing 12 and is connected to the injector housing 12. For example, the housing 28 is formed by injection moulding. As has long been known, the coil 24 can function as an electromagnet or can form an electromagnet. If the coil 24 is supplied with the electrical energy so that the electrical energy, in particular the electrical current, flows through the coil 24, the coil 24 thereby provides a magnetic field also referred to as a magnetic field. In particular, the magnetic field is generated in the coil 24.

The first valve element 22 is an armature or a component of an armature, wherein the armature and thus the valve element 22 can be moved in a sufficiently known manner by means of the magnetic field, in particular from the first closed position into the first open position. In particular, the valve element 22 is movable relative to the injector housing 12 from the first closed position into the first open position in a first direction illustrated in FIG. 1 by an arrow 30 and running parallel to the direction of movement, which is a first opening direction for the valve element 22, in particular by generating the magnetic field.

A first return element is associated with the valve element 22 and, in the exemplary embodiment shown in the figure, is formed as a mechanical spring 32 and thus as a solid body. By moving the valve element 22 from the first closed position to the first open position, the spring 32 is tensioned, in particular compressed or deflected. As a result, at least in the first open position, the spring 32 provides a spring force which points in a second direction illustrated in FIG. 1 by an arrow 34, running parallel to the direction of movement and opposite the first direction. The second direction is a second closing direction for the valve element 22, in which the valve element 22 is translationally movable relative to the injector housing 12 from the first open position into the first closed position. Thus, the valve element 22 can be moved or is moved by means of the spring force provided by the spring 32 in the second direction and thus from the first open position into the second closed position. In particular, the spring 32 also provides the spring force in the first closed position, so that the valve element 22 is held in the first closed position by means of the spring force and thus by means of the spring 32.

Overall, it can be seen that the valve 20 is an active or actively actuatable valve since the valve element 22 can be moved back and forth between the first closed position and the first open position by electrically actuating the valve 20. Here, the electrical, in particular electromagnetic, actuation of the valve 20 comprises supplying the coil 24 and thus the valve 20 with electrical energy and terminating or cancelling the supply of electrical energy to the coil 24. If the supply of electrical energy to the coil 24 is cancelled or terminated, the spring 32, against which or against the spring force of which the valve element 22 was previously opened by means of the magnetic field, can then close the valve element 22 again by means of the spring force, i.e. can move it out of the first open position and back into the first closed position and in particular can hold it in the first closed position.

Figure 2:
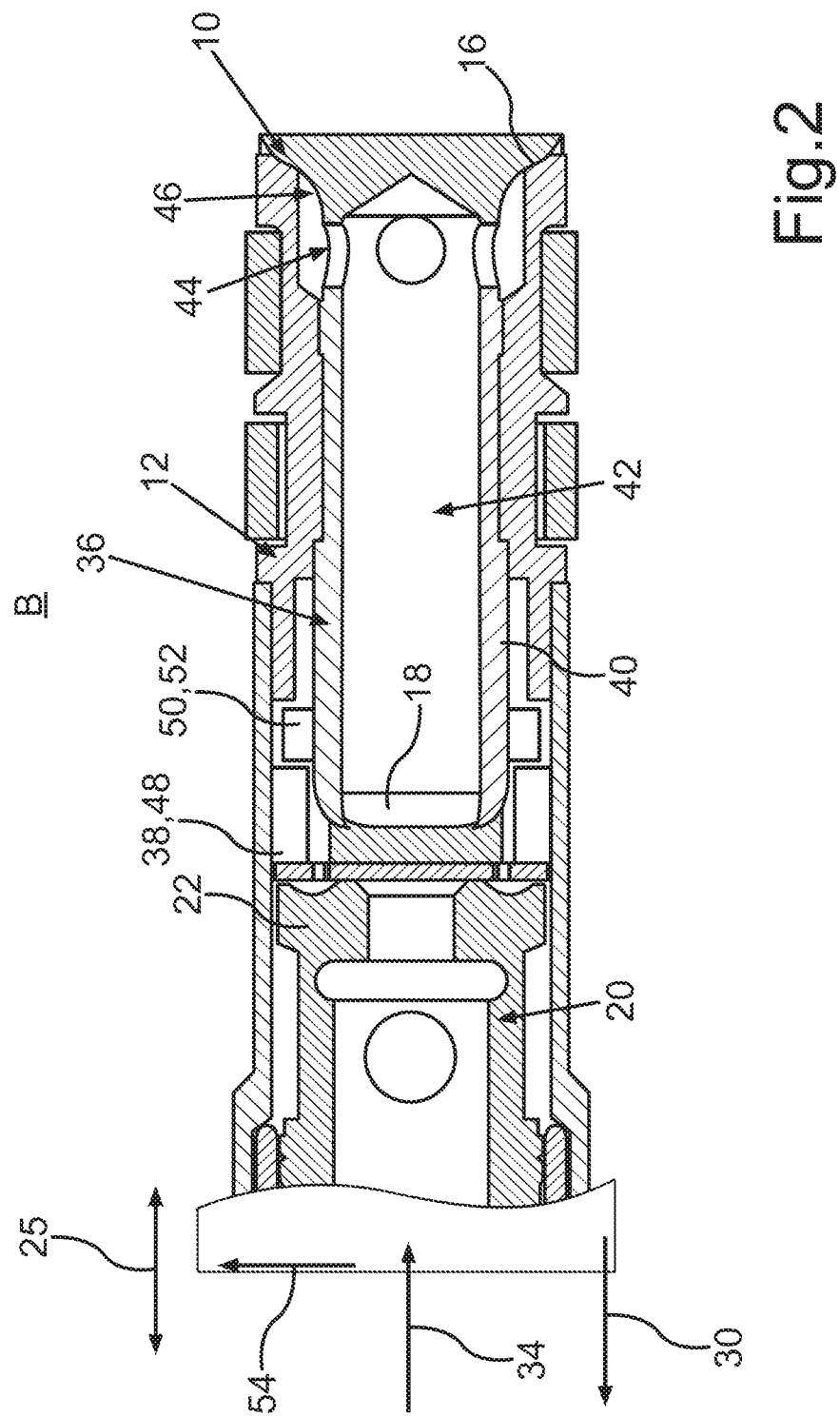
FIG. 2 shows a further schematic longitudinal sectional view of the injector in a region marked B in FIG. 1.

The injector 10 additionally comprises a check valve 36, which is a second valve of the injector 10 or is also referred to as a second valve and is shown enlarged in FIG. 2. The check valve 36 comprises a return element 38 and a second valve element 40 which is arranged in the injector housing 12 and which is movable translationally along the direction of movement illustrated by the double arrow 25 relative to the injector housing 12 between a second closed position shown in FIGS. 1 and 2 and at least one second open position. In the second closed position, the valve element 40 fluidically blocks the outlet port 16 so that no fuel can flow through the outlet opening 16. In the second open position, however, the valve element 40 releases the outlet opening 16 so that fuel can flow through the outlet opening 16 and thus can flow out of the injector housing 12 and out of the injector 10 as a whole. In this regard, the valve element 40 is movable in the second direction illustrated by the arrow 34 from the second closed position into the second open position so that the second direction for the valve element 40 is a second opening direction. The valve element 40 is movable in the first direction illustrated by the arrow 30 from the second open position into the second closed position, so that the first direction for the valve element 40 is a second closing direction. It can be seen that the valve elements 22 and 40 open and close in opposite directions.

When the valve element 22 is in the first open position, fuel can flow through the flow opening 18 and thus flow from the inlet opening 14 through the flow opening 18 to the valve element 40. In particular, the fuel flows into the valve element 40, i.e. into a channel 42 of the valve element 40, via the flow opening 18 and flows through the channel 42 and thus through the valve element 40. The fuel can flow out of the channel 42 and thus out of the valve element 40 via outflow openings 44 and can thus flow into a space 46, for example in the form of an annular space, which is arranged inside the injector housing 12 and outside the valve element 40 and is thereby bounded partly by the injector housing 12 and partly by the valve element 40. In the space 46, the fuel accommodated in the space 46, in particular its pressure, also referred to as fuel pressure, can act directly on the valve element 40 in such a way that the fuel pressure results in an opening force pointing in the second direction and acting directly on the valve element 40. If, for example, the opening force exceeds a return or closing force provided by the return element 38 and simply referred to also as force, which acts at least indirectly, in particular directly, on the valve element 40 and points in the first direction and thus opposes the opening force, the valve element 40 is moved by the opening force from the second closed position into the second open position and is thereby moved at least partially out of the injector housing 12. If the flow opening 18 is then fluidically blocked by moving the valve element 22 from the first open position into the first closed position or by causing or permitting a movement of the valve element 22 from the first open position into the first closed position, the fuel pressure prevailing in the space 46 and the resulting opening force decrease. If the opening force falls below the return or closing force, the valve element 40 is moved from the second open position back into the second closed position by means of the return force and thus by means of the return element 38 and is then held in the second closed position.

While the first valve 20 is an active or actively actuatable or switchable valve, the check valve 36 is a passive valve, the valve element 40 of which can be opened exclusively by means of the fuel pressure and can be closed exclusively by means of the return force and thus without external influence or control.

In order to avoid excessive pressure losses, the return element 38 is formed as a magnet 48, which is preferably a permanent magnet. The permanent magnet thus provides a magnetic field by means of which the second valve element 40 can be moved from the second open position back into the second closed position as a result of the decrease in fuel pressure and can then be held in the second closed position. In this case, the injector 10 comprises a material 50 which in the present case is provided on the valve element 40 and can thus be moved with the valve element 40. The material 50 is a magnetic or magnetisable material, such as a ferromagnetic material. In particular, the material 50 may comprise iron. The material 50 forms a material element 52, which can be provided on the valve element 40 or can be a component of the valve element 40. The material 50 and thus the material element 52 are configured to interact with the magnetic field provided by the permanent magnet in such a way that the magnetic field results in the aforementioned closing force acting on the material element 52 and thus on the valve element 40, pointing in the first direction and configured as a magnetic force, by means of which, as a result of the decrease in pressure, the second valve element 40 can be moved out of the second open position and back into the second closed position, i.e. can be closed, and can then be held in the second closed position.

Alternatively to the embodiment shown in figures it is conceivable that the material 50 and thus the material element 52 are fixed to the housing or are components of the housing, wherein the magnet 48 can then be held on the valve element 40 or can be a component of the valve element 40. The material 50 or the material element 52 and the corresponding magnet 48 are arranged in such a way that, by moving the valve element 40 from the second closed position into the second open position, a distance between the magnet 48 and the material 50 (material element 52) running along the direction of movement is successively increased, as a result of which the magnetic force decreases non-linearly and preferably quadratically in relation to the distance. Thus, for an initial movement of the valve element 40 from the second closed position in the direction of the first open position, a high opening force, which acts in the second direction, is required or must be applied, wherein a substantially lower opening force compared to the high opening force must be applied in order to keep the valve element 40 open, i.e. in the second open position.

It can be seen from FIGS. 1 and 2 that in the second open position and also in the second closed position, the material 50 is arranged without overlap with the magnet 48 along a direction running perpendicular to the direction of movement and, in the present case, pointing outwards and indicated by an arrow 54 in FIG. 2. Furthermore, both in the second open position and in the second closed position, the material 50 is at least partially overlapped by the magnet 48 in the first direction running parallel to the direction of movement and pointing towards the first valve 20. In this case, the aforementioned distance runs along the direction of movement, i.e. parallel to the direction of movement. In this way, the previously described non-linear behaviour of the closing force configured as a magnetic force can be realised particularly well.

LIST OF REFERENCE SIGNS 10 injector
12 injector housing
14 inlet opening
16 outlet opening
18 flow opening
20 first valve
22 first valve element
24 coil
25 double arrow
26 contact element
28 housing
30 arrow
32 spring
34 arrow
36 check valve
38 return element
40 second valve element
42 channel
44 outflow opening
46 space
48 magnet
50 material
52 material element
54 arrow
B region

The invention claimed is:

1. An injector for introducing fuel into at least one combustion chamber of a combustion engine, the injector comprising:
   an injector housing through which the fuel flows, wherein the injector housing includes: at least one inlet opening via which the fuel is introduced into the injector housing, and at least one outlet opening, via which the fuel is discharged from the injector housing in order to introduce the fuel into the combustion chamber;
   at least one flow opening arranged inside the injector housing downstream of the inlet opening and upstream of the outlet opening, via which the outlet opening is supplied with the fuel flowing through the inlet opening;
   an electrically actuatable first valve, which has a first valve element arranged in the injector housing and which is movable relative to the injector housing by electrically actuating the first valve between a first closed position fluidically blocking the flow opening and at least one first open position releasing the flow opening; and
   a check valve as a second valve, which has a return element and a second valve element which is arranged in the injector housing and is movable relative to the injector housing between a second closed position fluidically blocking the outlet opening and at least one second open position releasing the outlet opening, and which is movable from the second closed position to the second open position by means of a pressure caused by the fuel flowing from the flow opening to the second valve element and acting on the second valve element and is moveable from the second open position back into the second closed position as a result of a decrease of the pressure by means of the return element and is maintainable in the second closed position by means of the return element, wherein the return element is a magnet, by means of which a magnetic field is provided, by means of which, as a result of the decrease in pressure, the second valve element is moveable from the second open position back into the second closed position and then held in the second closed position.

2. The injector of claim 1, wherein the magnet is a permanent magnet.

3. The injector of claim 1, wherein a material which is configured to interact with the magnetic field in such a way that the magnetic field results in a force acting on the second valve element, by means of which, as a result of the decrease in pressure, the second valve element is moveable from the second open position back into the second closed position and is maintainable in the second closed position.

4. The injector of claim 3, wherein moving the second valve element from the second closed position to the second open position increases a distance between the magnet and the material, as a result of which the force decreases non-linearly relative to the distance.

5. The injector of claim 3, wherein the second valve element is translationally movable along a direction of movement relative to the injector housing between the second open position and the second closed position.

6. The injector of claim 5, wherein the material, at least in the second open position is arranged along a direction running perpendicular to the direction of movement without overlap with the magnet.

7. The injector of claim 5, wherein the material is at least partially overlapped by the magnet both in the second open position and in the second closed position in a direction running parallel to the direction of movement and pointing towards or away from the first valve.

8. The injector of claim 5, wherein moving the second valve element from the second closed position to the second open position increases a distance between the magnet and the material, as a result of which the force decreases non-linearly relative to the distance, and wherein the distance runs along the direction of movement.

9. The injector of claim 1, wherein the first valve element is moveable in a first opening direction from the first closed position into the first open position relative to the injector housing, and wherein the second valve element is movable in a second opening direction, opposite the first opening direction, from the second closed position into the second open position relative to the injector housing.

10. A combustion engine for a motor vehicle, comprising the injector of claim 1.

* * * * *